United States Patent [19]

Kang et al.

[11] Patent Number: 5,386,333

[45] Date of Patent: Jan. 31, 1995

[54] HEAD DRUM CLEANING DEVICE FOR MAGNETIC RECORDING AND REPRODUCING APPARATUS

[75] Inventors: Myung G. Kang, Seoul; Seong S. Kang; Sung H. Choi, both of Kyungki; Mun C. Joung, Seoul; Byoung G. Jang, Kyungki; Key Y. Ryu; Hyo C. Yu, both of Seoul; Sang J. Lee, Kyungki, all of Rep. of Korea

[73] Assignee: Goldstar Co., Ltd., Seoul, Rep. of Korea

[21] Appl. No.: 73,479

[22] Filed: Jun. 9, 1993

[30] Foreign Application Priority Data

Jun. 17, 1992 [KR] Rep. of Korea ............... 1992 10712
Jun. 23, 1992 [KR] Rep. of Korea ............... 1992 10924

[51] Int. Cl.6 ............................................. G11B 5/41
[52] U.S. Cl. ................................................. 360/128
[58] Field of Search .................. 360/128, 110, 137; 369/71; 15/DIG. 12, DIG. 13

[56] References Cited

U.S. PATENT DOCUMENTS

| 5,170,304 | 12/1992 | Katohino et al. | 360/128 |
| 5,182,691 | 1/1993 | Mimasu et al. | 360/128 |

FOREIGN PATENT DOCUMENTS

| 482742 | 4/1992 | European Pat. Off. | 360/128 A |
| 4223201 | 1/1993 | European Pat. Off. | 360/128 A |
| 4225722 | 2/1993 | European Pat. Off. | 360/128 A |
| 66016 | 3/1991 | Japan | 360/128 A |
| 3-134812 | 6/1991 | Japan | 360/128 |
| 3245313 | 10/1991 | Japan | 360/128 A |
| 4-1908 | 1/1992 | Japan | 360/128 |
| 4105209 | 4/1992 | Japan | 360/128 A |
| 4-186512 | 7/1992 | Japan | 360/128 A |
| 4-271006 | 9/1992 | Japan | 360/128 |
| 4271048 | 9/1992 | Japan | 360/137 |

Primary Examiner—John H. Wolff
Assistant Examiner—Allen Cao

[57] ABSTRACT

A head drum cleaning device for a magnetic recording and reproducing apparatus comprising a head cleaning lever pivotally mounted to a fixed base plate of the apparatus by a pin fixed to the fixed base plate, a cleaning roller rotatably mounted to one end of the head cleaning lever by a pin fixed to the head cleaning lever, a drive member constituted by a part of a slide base of the apparatus and adapted to drive the head cleaning lever, and a head cleaning lever rotating unit operatively connected to the drive member and adapted to pivot the head cleaning lever through two steps, namely, in toward the drum and then in the reverse direction. The head drum cleaning device has a simple construction capable of achieving a smooth cleaning operation, in that the head cleaning lever is actuated by the drive member mounted to the slide base to clean the rotating head drum. The head drum cleaning device can be applied to compact camcorders such as 8 mm camcorders using the slide base.

4 Claims, 7 Drawing Sheets

HEAD DRUM CLEANING DEVICE FOR MAGNETIC RECORDING AND REPRODUCING APPARATUS

BACKGROUND OF THE INVENTION

1. Field of the Invention

The present invention relates to a device for cleaning a head drum of a magnetic recording and reproducing apparatus, and more particularly to a head drum cleaning device for a magnetic recording and reproducing apparatus, comprising a head cleaning arm driven by a slide base in a sliding loading type camcorder.

2. Description of the Prior Art

Such a cleaning device has been conventionally employed n a potable VCR, for cleaning a rotating head drum. However, the conventional cleaning device has a complicated construction which makes the device difficult to be employed in a camcorder adopting a sliding loading system, since the camcorder requires a compact deck mechanism having an insufficient space to occupy the cleaning device.

SUMMARY OF THE INVENTION

Therefore, an object of the invention is to provide a head drum cleaning device with a compact construction enabling an application to a slide loading type camcorder.

Another object of the invention is to provide a head drum cleaning device capable of cleaning a head drum during a tape loading operation, by driving a head cleaning lever rotating member by a slide base and driving a cleaning lever by the driven head cleaning lever rotating member.

In accordance with the present invention, these objects can be accomplished by providing a head drum cleaning device for a magnetic recording and reproducing apparatus comprising: head cleaning means for cleaning a rotation head drum; driving means for driving the head cleaning means, the driving means being constituted by a part of a slide base of the apparatus; and head cleaning lever pivoting means operatively connected to the driving means, for rotating the head cleaning means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
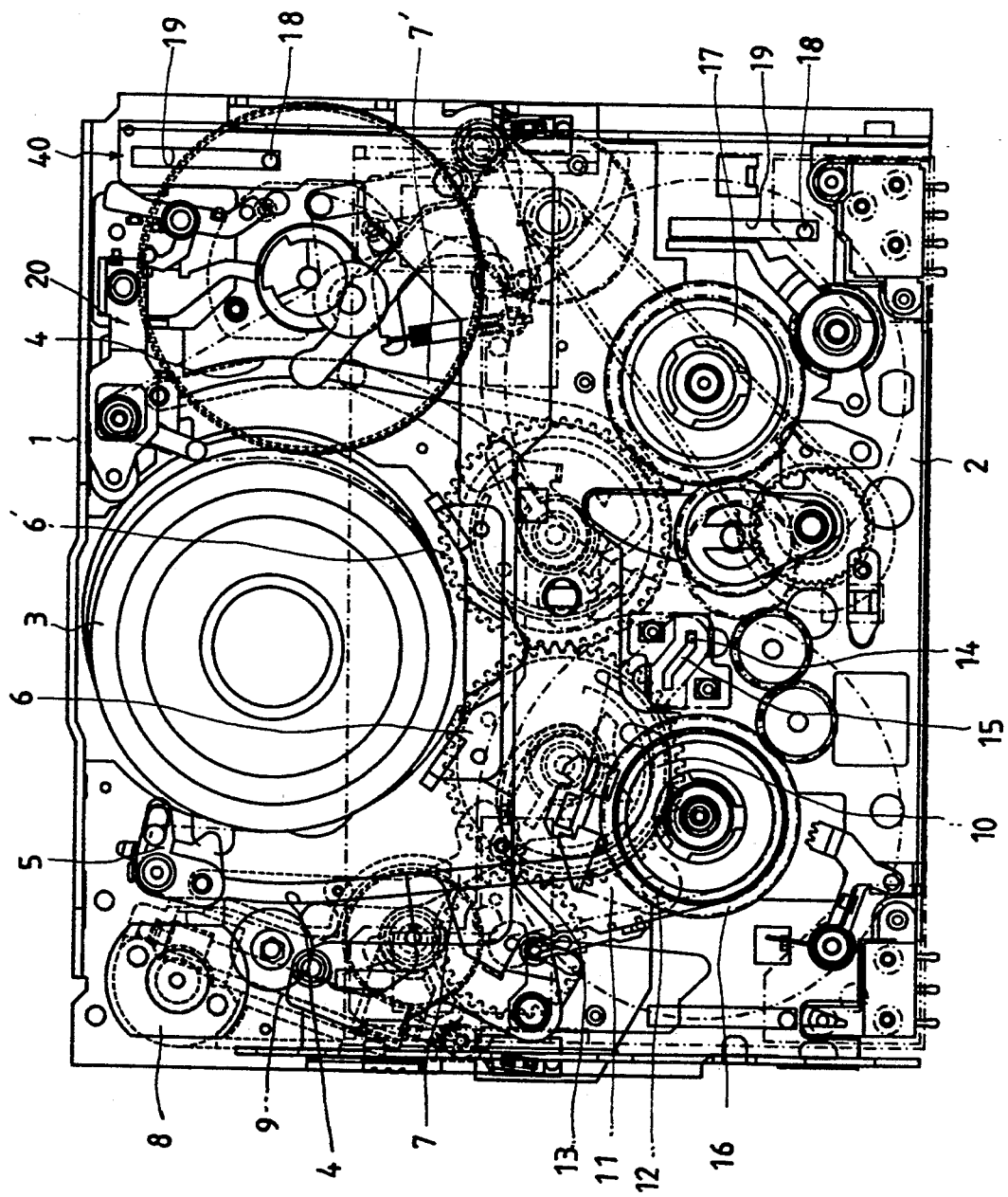
FIG. 1 is a plan view illustrating the inner construction of a deck mechanism in which a head drum cleaning device according to a first embodiment of the present invention is employed.
Figure 2:
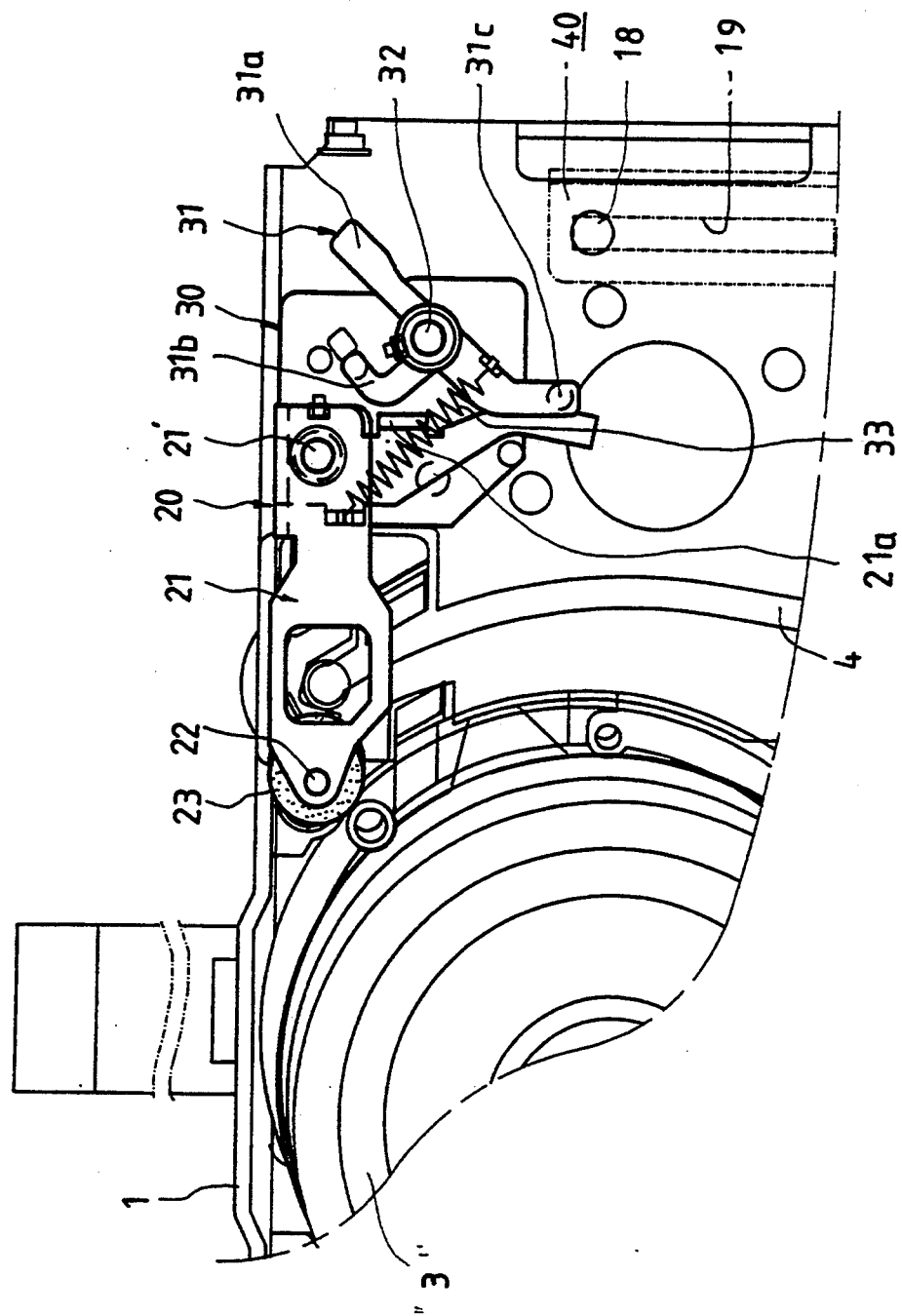
FIGS. 2 to 4 are partial plan views of the head drum cleaning device according to the first embodiment of the present invention, showing different operation states thereof.
Figure 3:
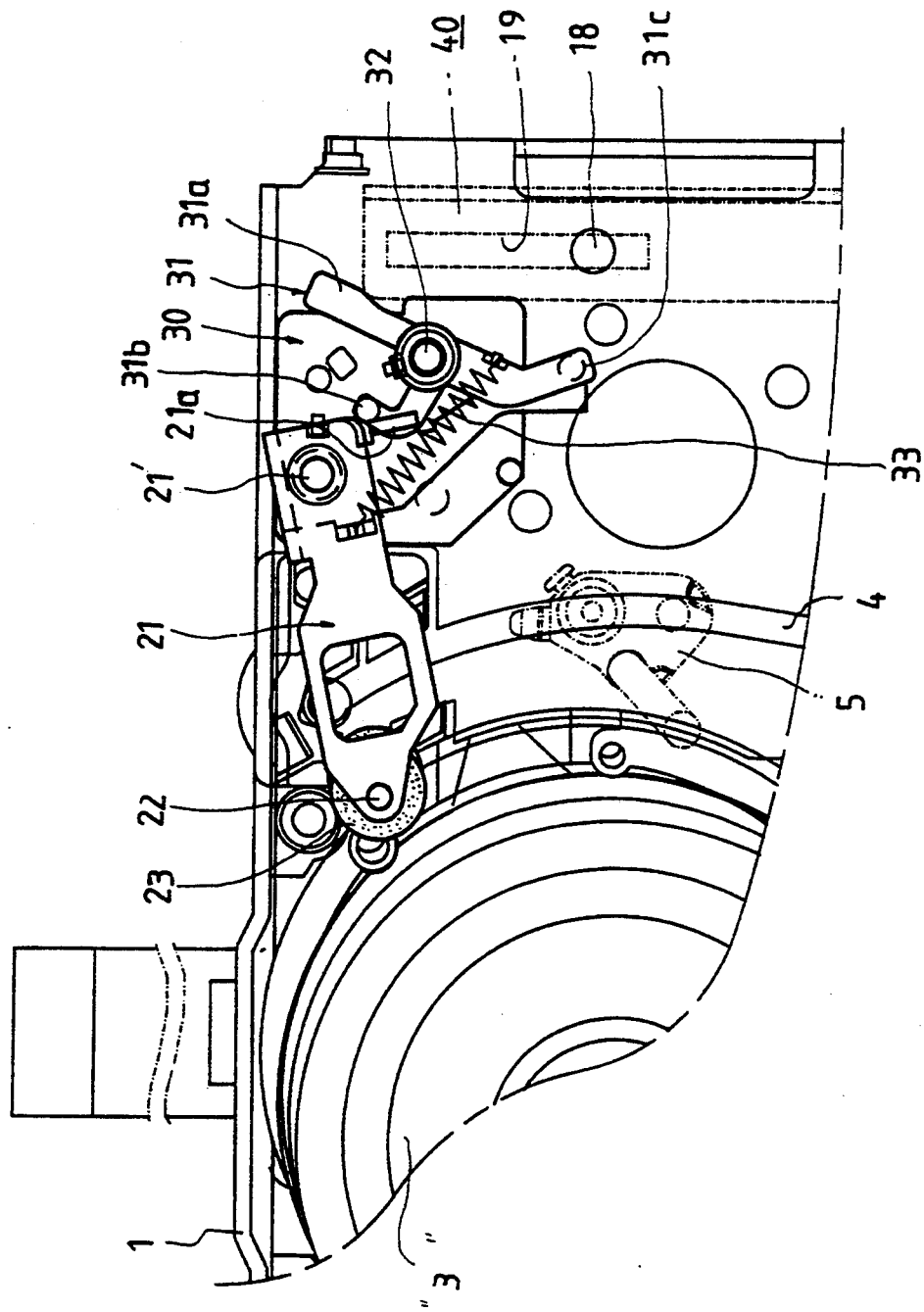
Figure 4:
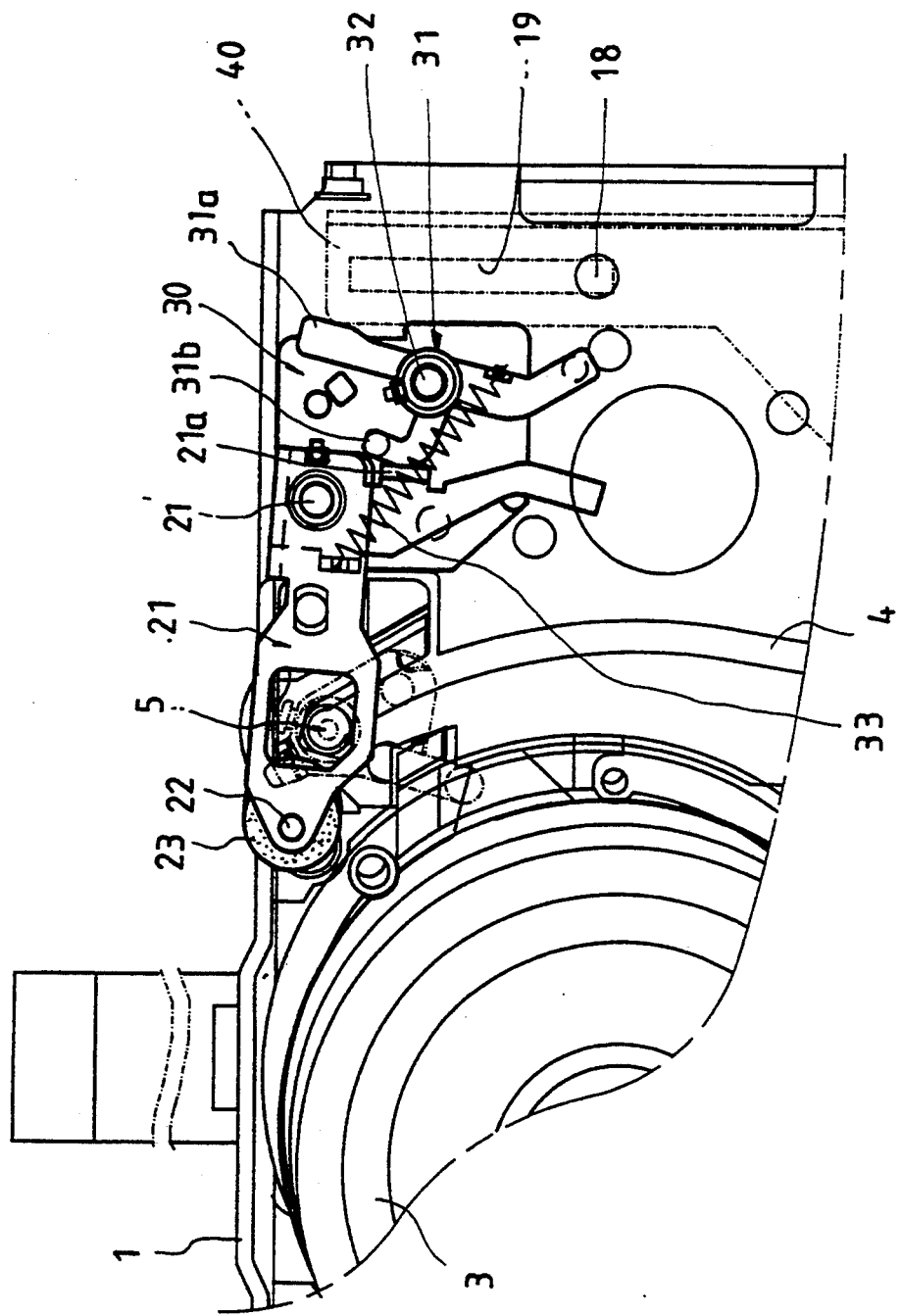

Referring to FIG. 1, there is illustrated a deck mechanism in which a head drum cleaning device according to a first embodiment of the present invention is employed. The head drum cleaning device is illustrated in FIGS. 2 to 4.

As shown in the drawings, mounted to a fixed base plate 1 is a slide base 2 which is forwardly and rearwardly slidable along the fixed base plate 1. At the middle portion of fixed base plate 1, a rotating head drum 3 is disposed.

The deck mechanism comprises a construction for guiding the slide movement of the slide base 2 along the fixed base plate 1. The guide construction comprises a plurality of guide pins 18 protruded from the upper surface of the fixed base plate 1 and a plurality of guide slots 19 formed at the slide base 2. Each guide pin 18 is received in each corresponding guide slot 19 when the slide base 2 is assembled with the fixed base plate 1, so that the slide base 2 can slide while being guided by the guide pins 18.

The fixed base plate also has a pair of loading guide slots 4 formed at opposite sides of the rotating head drum 3, respectively. In each loading guide slot 4, a slant post assembly 5 is received to move along the loading guide slot 4. The slant post assemblies 5 are connected with loading gears 6 and 6' disposed in front of the rotating head drum 3, by means of loading arms 7 and 7', respectively. With this construction, the slant post assemblies 5 can move along the loading guide slots 4 when the loading gears 6 and 6' rotate, respectively.

A loading motor 8 is mounted to one side portion of the rear end of fixed base plate 1. The loading motor 8 is connected at its output shaft to the loading gear 6, via a gear train 9, so that its rotation force is transmitted to the loading gear 6 and thus to the loading gear 6' engaged with the loading gear 6. Accordingly, both the loading gears 6 and 6' can rotate.

A cam groove 10 is provided at the lower surface of the loading gear 6. To the fixed base plate 1, a cam lever 11 is pivotally coupled by means of a pin 12 fixed to the fixed base plate 1, so as to pivot about the pin 12. The cam lever 11 is provided at its one end with a cam pin 13 which is engaged in the cam groove 10 of loading gear 6. The cam lever 11 also has at the other end thereof a slide base driving pin 14 which is received in a cam s lot 15 formed at the slide base 2.

As the loading gear 6 rotates, the cam lever 11 operatively connected to the loading gear 6 pivots about the pin 12, thereby causing the slide base 2 to move forwardly and rearwardly.

To the slide base 2, a supply reel table 16 and a take-up reel table 17 are fixedly mounted so that they move forwardly and rearwardly, upon the forward and rearward movements of the slide base 2.

The head drum cleaning device of the first embodiment employed in the deck mechanism with the above-mentioned construction comprises a head cleaning lever 21 pivotally mounted to the fixed base plate 1 by means of a pin 21' fixed to the fixed base plate 1. The head cleaning lever 21 has a contact portion 21a. To one end of the head cleaning lever 21, a cleaning roller 23 is rotatably mounted by means of a pin 22 fixed to the head cleaning lever 21. The head cleaning device also comprises a drive member 40 for driving the head cleaning lever 21 and a head cleaning lever rotating unit 30 operatively connected to the drive member 40 and adapted to pivot the head cleaning lever 21 through two steps, namely, in a direction toward the drum and then in the reverse direction.

In accordance with the first embodiment, the head cleaning lever pivoting unit 30 comprises an actuating arm 31 disposed adjacent to the head cleaning lever 21 and Pivotally mounted to the fixed base plate 1 by means of a pin 32 fixed to the fixed base plate 1. The actuating arm 31 includes a first bar 31a actuated by coming into contact with the drive member 40 mounted to the slide base 2, to pivot the head cleaning lever 21 in a direction that the cleaning roller 23 moves toward the head drum 3, a second bar 31b actuated by coming into contact with the contact portion 21a of head cleaning lever 21, to pivot the head cleaning lever 21 in a direction that the cleaning roller 23 moves away from the head drum 3, and a spring connecting bar 31c. The head cleaning lever pivoting unit 30 also comprises a spring 33 connected at one end thereof to the head cleaning lever 21 and at the other end thereof to the spring connecting bar 31c of the actuating arm 31 and adapted to urge the head cleaning lever 21 toward the actuating arm 31.

When an operation in a tape loading mode is carried out under a condition shown by the solid line in FIG. 2, the loading gears 6 and 8' rotate by the drive force from the loading motor 8. By the rotations of loading gears 6 and 6', the slide base 2 moves rearwardly from its front position shown in FIG. 2, so that the driving member 40 pushes the first bar 31a of the actuating arm 31, thereby causing the actuating arm 31 to pivot counter clockwise. At this time, the spring 33 connected between the actuating arm 31 and the head cleaning lever 21 pulls the head cleaning lever 21, thereby causing the head cleaning lever 21 to pivot in counter clockwise. As the head cleaning lever 21 pivots in counter clockwise, the cleaning roller 23 rotatably mounted to one end of the head cleaning lever 21 comes into contact with the rotating head drum 3, as shown in FIG. 3. Accordingly, the cleaning roller 23 cleans the rotating head drum 3 for a moment.

After the cleaning operation of the cleaning roller 23 has been completed, that is, when the tape loading operation is nearly completed, the second bar 31b of the actuating arm 31 which pivots further by the continued pushing operation of drive member 40 pushes the contact portion 21a of head cleaning lever 21, as shown in FIG. 4. As a result, the cleaning lever 21 pivots in clockwise, so that the cleaning roller 23 moves away from the rotating head drum 3.

Subsequently, the tape loading operation is completed. At this time, the cleaning roller 23 is maintained at its position separated from the rotating head drum 3 and thus does not interfere the travelling of the tape in a play mode.

Figure 5:
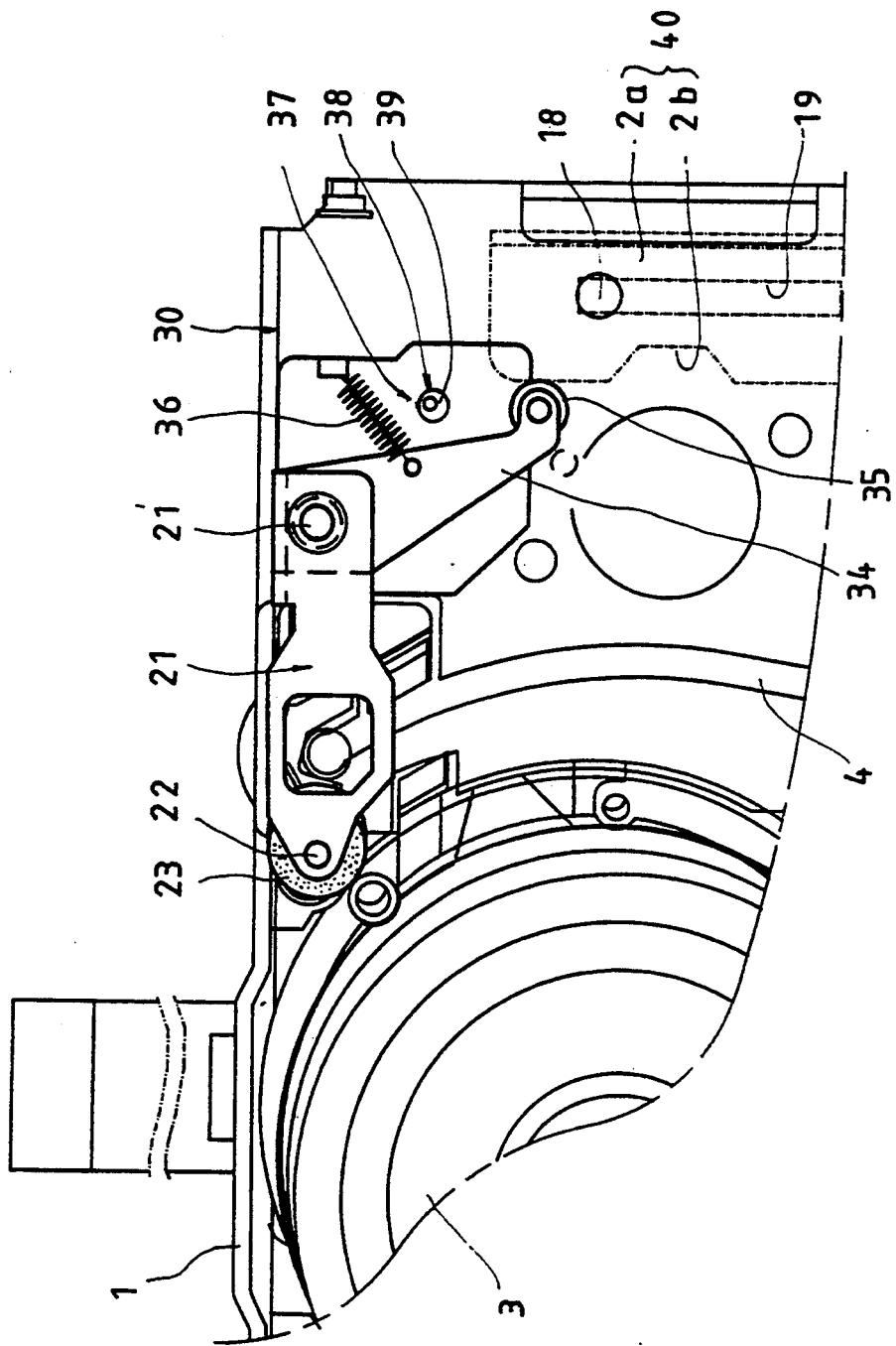
FIGS. 5 to 7 are partial plan views of a head drum cleaning device according to a second embodiment of the present invention, showing different operation states thereof.
Figure 6:
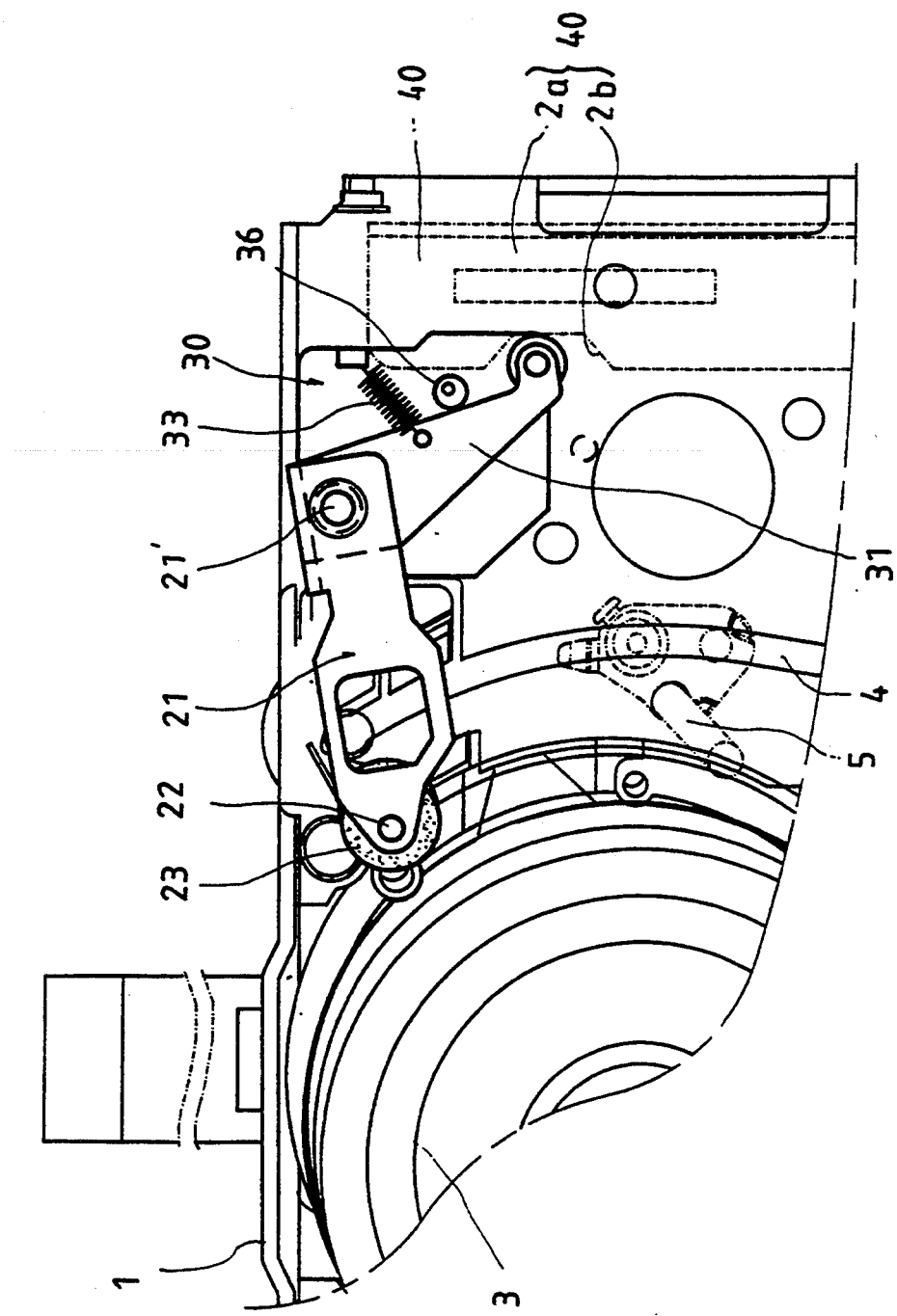
Figure 7:
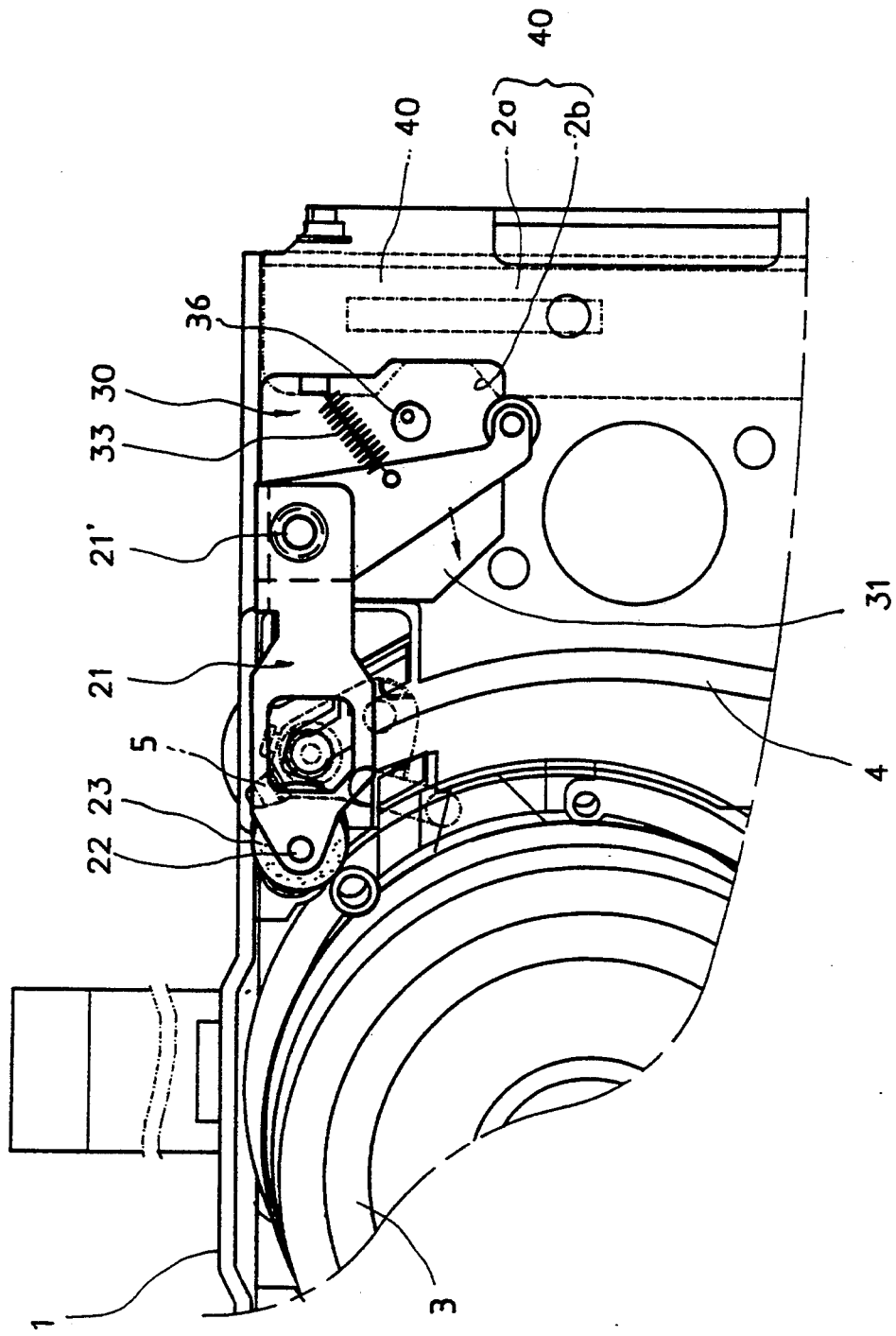

Referring to FIGS. 5 to 7, there is illustrated a head drum cleaning device according to a second embodiment of the present invention is employed. In FIGS. 5 to 7, the similar elements to those shown in FIGS. 2 to 4 are denoted by the same reference numerals. The head drum cleaning device according to the second embodiment comprises a head cleaning lever 21 pivotally mounted to the fixed base plate 1 by means of a pin 21' fixed to the fixed base plate 1 and positioned adjacent to one side portion of the head drum 3. To one end of the head cleaning lever 21, a cleaning roller 23 is rotatably mounted by means of a pin 22 fixed to the head cleaning lever 21. The head cleaning device also comprises a drive member 40 for driving the head cleaning lever 21, a head cleaning lever rotating unit 30 operatively connected to the drive member 40 and adapted to pivot the head cleaning lever 21 through two steps, and a stopper 37 fixedly mounted to the fixed base plate 1 and positioned at a portion of the head cleaning lever 21. In accordance with this embodiment, the drive member 40 is constituted by a part of the slide base 2.

In accordance with the second embodiment, the drive member 40 is constituted by a protrusion portion 2a formed at the slide base 2, said protrusion portion having; a groove 2b formed therein.

The head cleaning lever pivoting unit 30 comprises an actuating arm 34 extending from the head cleaning lever 21 and disposed to come into contact with the drive member 40, and a spring 36 adapted to urge the cleaning roller 23 of head cleaning lever 21 against the rotating head drum 3. The actuating arm 34 has at its end a roller 35 adapted to reduce friction generated when the actuating arm 34 comes into contact with the drive member 40 being moved.

The stopper 37 comes into contact with the actuating arm 34 of head cleaning lever 21 and thus prevents a rotation of the head cleaning lever 21 caused by the force of spring 36. The stopper 37 may be a stopper 39 threadedly coupled to the fixed base plate 1, by means of an eccentric screw 37. In such a case, utilizing the stopper 39, it is possible to adjust the pivotal movement of the cleaning lever 21 to a desired range.

When an operation in a tape loading mode is carried out under a condition shown by the solid line in FIG. 5, the loading gears 6 and 6' rotate by the drive force from the loading motor 8. By the rotations of loading gears 6 and 6', the slide base 2 moves rearwardly from its front position shown in FIG. 5. As the slide base 2 moves rearwardly, the roller 35 of actuating arm 34 which is in contact with the protrusion portion 2a of slide base 2 is received in the groove 2b of slide base 2, thereby causing the head cleaning lever 21 to pivot counter clockwise by virtue of the force of spring 36, as shown in FIG. 6. As the head cleaning lever 21 pivots in counter clockwise, the cleaning roller 23 rotatably mounted to one end of the head cleaning lever 21 comes into contact with the rotating head drum 3. Accordingly, the cleaning roller 23 cleans the rotating head drum 3 for a moment.

After the cleaning operation of the cleaning roller 23 has been completed, that is, when the tape loading operation is nearly completed, the roller 35 of actuating arm 34 emerges from the groove 2b of slide base 2 and then comes into contact with the protrusion portion 2a of slide base 2, as shown in FIG. 7. As a result, the head cleaning lever 21 pivots clockwise, so that the cleaning roller 23 moves away from the rotating head drum 3.

Subsequently, the tape loading operation is completed. At this time, the cleaning roller 23 is maintained at its position separated from the rotating head drum 3 and thus does not interfere the travelling of the tape in a play mode.

As apparent from the above description, the present invention provides a head drum cleaning device with a simple construction capable of achieving a smooth cleaning operation, in that the head cleaning lever is actuated by the drive member mounted to the slide base, to clean the rotating head drum. The head drum cleaning device can be applied to compact camcorders such as 8 mm camcorders, using the slide base. Accordingly, the present invention can contribute to an improvement in reliability of compact camcorders.

Although the preferred embodiments of the invention have been disclosed for illustrative purposes, those skilled in the art will appreciate that various modifications and additions are possible, without departing from the scope and spirit of the invention as disclosed in the accompanying claims.

What is claimed is:

1. A head drum cleaning device for a magnetic recording and reproducing apparatus comprising:
   head cleaning means for cleaning a rotating head drum;
   driving means for driving the head cleaning means, the driving means being constituted by a part of a slide base of the apparatus;
   head cleaning lever pivoting means, operatively connected to the driving means, for pivoting the head cleaning means;
   wherein the head cleaning means comprises a head cleaning lever pivotally mounted to a fixed base plate of the apparatus and positioned adjacent to one side portion of the head drum, and a cleaning roller rotatably mounted to one end of the head cleaning lever;
   wherein the head cleaning lever pivoting means comprises:
   an actuating arm disposed adjacent to the head cleaning lever and pivotally mounted to the fixed base plate, said actuating arm including a first bar actuated by coming into contact with the drive means, for pivoting the head cleaning lever in a direction that the cleaning roller moves toward the head drum, a second bar actuated b coming into contact with the head cleaning lever, for pivoting the head cleaning lever in a direction that the cleaning roller moves away from the head drum and a spring connecting bar; and,
   a spring connected at one end thereof to the head cleaning lever and at the other end thereof to the spring connecting bar of the actuating arm for urging the head cleaning lever toward the actuating arm.

2. A head drum cleaning device in accordance claim 1, wherein the actuating arm has at its end a roller for reducing reduce friction.

3. A head drum cleaning device in accordance with claim 1 further comprising stopper means for stopping the pivotal movement of the head cleaning lever toward the head drum, the stopper means comprising a stopper threadedly coupled to the fixed base plate by an eccentric screw adapted to come into contact with the actuating arm.

4. A head drum cleaning device for a magnetic recording and reproducing apparatus comprising:
   head cleaning means for cleaning a rotating head drum;
   driving means for driving the head cleaning means, the driving means being constituted by a part of a slide base of the apparatus;
   head cleaning lever pivoting means, operatively connected to the driving means, for pivoting the head cleaning means;
   wherein the head cleaning means comprises a head cleaning lever pivotally mounted to a fixed base plate of the apparatus and positioned adjacent to one side portion of the head drum, and a cleaning roller rotatably mounted to one end of the head cleaning lever;
   wherein the drive means comprises a protrusion portion formed at the slide base and a groove formed at the protrusion portion, and the head cleaning lever pivoting means comprises an actuating arm extending from the head cleaning lever and actuated by entering, at its end, the groove of the drive means, to pivot the head cleaning lever in a direction that the cleaning roller moves toward the head drum; and,
   wherein there is further provided a spring for urging the cleaning roller of the head cleaning lever against the rotating head drum.

* * * * *

UNITED STATES PATENT AND TRADEMARK OFFICE
CERTIFICATE OF CORRECTION

PATENT NO. : 5,386,333
DATED : January 31, 1995
INVENTOR(S) : Kang et al.

It is certified that error appears in the above-indentified patent and that said Letters Patent is hereby corrected as shown below:

ON THE TITLE PAGE:

[75] Inventors:

Change "Key Y. Ryu" to --Kye Y. Ryu--

Signed and Sealed this

Thirtieth Day of May, 1995

Attest:

BRUCE LEHMAN

Attesting Officer            Commissioner of Patents and Trademarks